United States Patent [19]
Doerre

[11] 4,128,866
[45] Dec. 5, 1978

[54] POWER SUPPLY WITH CURRENT FOLDBACK

[75] Inventor: George W. Doerre, Framingham, Mass.

[73] Assignee: Data General Corporation, Westboro, Mass.

[21] Appl. No.: 779,733

[22] Filed: Mar. 21, 1977

[51] Int. Cl.² .............................................. H02M 3/24
[52] U.S. Cl. ........................................ 363/15; 363/25; 363/28; 363/56; 363/79
[58] Field of Search .................. 363/24, 25, 27, 28, 363/50, 55–58, 74, 75, 79, 80, 95–98, 15

[56] References Cited
U.S. PATENT DOCUMENTS

| | | | |
|---|---|---|---|
| 3,573,598 | 4/1971 | Clarke et al. | 363/27 |
| 3,790,878 | 2/1974 | Brokaw | 323/20 X |
| 3,801,894 | 4/1974 | Spiegel | 323/20 X |
| 4,044,294 | 8/1977 | Grundy | 363/56 X |

*Primary Examiner*—William M. Shoop
*Attorney, Agent, or Firm*—Donald Brown

[57] ABSTRACT

Power supply having means for developing a voltage overload signal representing a current overload condition in the power supply and then reducing the output current from the power supply as a result of the voltage overload signal. The voltage overload signal is applied to a servo or error amplifier to cause the error signal therefrom to change in a manner to reduce the power supply output voltage which in turn is fedback to the said amplifier to cause output current foldback.

7 Claims, 2 Drawing Figures

POWER SUPPLY WITH CURRENT FOLDBACK

BACKGROUND OF THE DISCLOSURE

This invention is directed to power supplies and more particularly is directed to means for providing foldback current limiting for a power supply in order to prevent the power supply from self destructing in the event that a current overload condition occurs.

The present invention is particularly useful in d.c. power supplies employing power switching transistors and a servo or error amplifier for controlling same, these types of power supplies being currently used in applications such as providing d.c. power to the central processing unit or other portions of a computer.

This invention is an improvement over other current limiting foldback techniques currently used in that the same servo or error amplifier providing the error signal is also used to effect current limiting.

Reference may be had to the Text VOL.III, Proceedings of Power Con 3 Third National Solid - State Power Conversion Conference June 1976, copyright (©) Ronald I. Birdsall and Associates 1976, published by Powercon,Inc. Oxnard, California for an overview of power supplies, as well as switching power supplies and in particular to page E3-4 thereof for a disclosure of a prior art current limiting technique.

BRIEF DESCRIPTION OF THE DISCLOSURE

This disclosure is directed to foldback current limiting for a power supply, current limiting being provided by altering the error control signal from an error or servo amplifier to reduce the power supply output current.

In the preferred embodiment, an overload voltage signal is derived which is indicative of an overload current condition. The overload voltage signal is provided to the error or servo amplifier to cause the error signal to reduce the power supply output voltage.

The power supply output voltage is fed back to the error or servo amplifier under this condition to further reduce the power supply output voltage thereby causing a reduction or foldback in power supply output current.

DETAILED DESCRIPTION OF THE DISCLOSURE

Figures 1, 2:
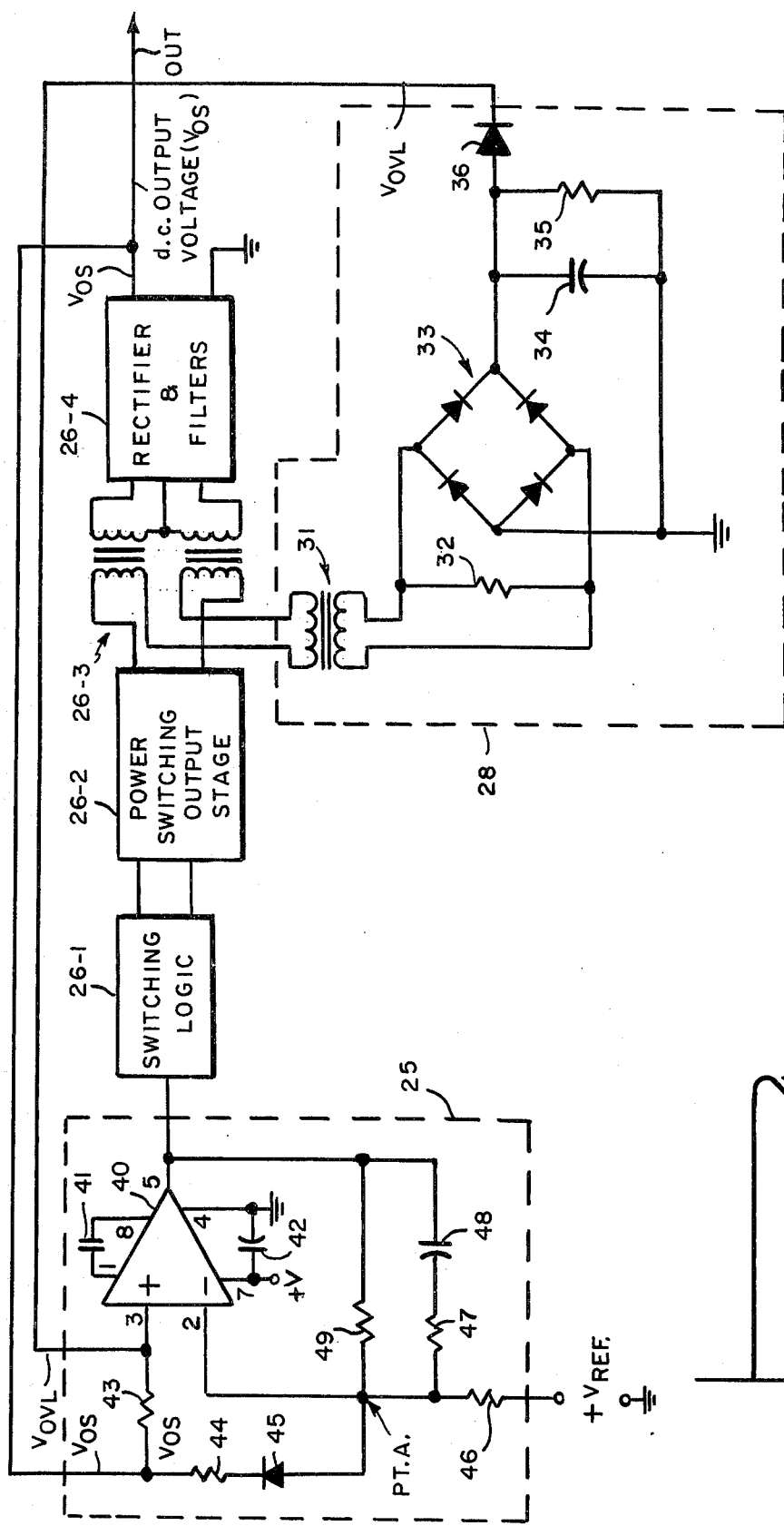
FIG. 1 is a diagram illustrating a power supply which includes the invention shown in schematic form, and the conventional power supply in block form.
FIG. 2 is a graph showing the ideal performance of a power supply having current limiting as provided in this invention under an overload condition bearing in mind that the components e.g., diodes, do not perform ideally.

Reference should now be had to FIG. 1 which shows in block form a conventional switching power supply. The power supply comprises conventional power switching logic 26-1 and a conventional power switching output stage 26-2, a conventional power transformer 26-3, and conventional rectifier and filter unit 26-4.

These units 26-1 to 26-4 are controlled by the error or servo amplifier 25 in a conventional manner to provide a d.c. output signal (Vos) depending upon the error signal provided from error or servo amplifier 25.

The power switching logic 26-1 may be provided by a portion of a commercially available integrated circuit chips such as a Motorola "MC 3420" or a Silicon General "SG 1524".

Reference may be had to the text entitled VOL.III Proceedings of Power Con 3 June 1976, Copyright (©) 1976 by Ronald I. Birdsall and Associates, and published by Powercon,Inc. of Oxnard, California, pages E 3-1 to E 3-7 which discloses the Silicon General "SG 1524" and its uses. Also see The Voltage Regulator Handbook (©) Motorola Inc., 1976, for a description of the Motorola "MC 3420" and its uses.

Reference may also be had to page A 2-7 of this Power con text for further power switching circuitry. The power output stage is also conventional in the art with examples being shown at page A 2-7 or in FIG. 14 page E 3-4 of the aforementioned Power con text, see FIG. 14 which give conventional output stages.

Since the conventional devices 26-1 to 26-4 only form the setting for the present invention, their operation will not be described since those skilled in the art are fully aware of these devices and their operation.

At 28 in FIG. 1 there is shown a current voltage converter i.e., an IV converter 28 for providing an output voltage Vovl upon detection of a current overload condition. The IV converter 28 comprises a transformer 31 coupled in Series W to the primary of transformer 26-3.

The secondary winding thereof is coupled to a load resistor 32 which is coupled across a rectifying bridge 33. A capacitor 34 and a resistor 35 are provided and act as a peak detector and minimum load to produce a d.c. voltage at diode 36. The diode 36 acts to block voltage indicative of less than current overload levels. Thus the IV converter 28 provides a voltage signal Vovl representative of overload current being detected at the primary of the transformer 26-3.

At 25 in FIG. 1 there is shown the servo or error amplifier for controlling the power switcher 26-1 in order to regulate the output of the power supply.

The servo or error amplifier 25 comprises a conventional linear operational amplifier 40 such as type LM 301 commercially available from Texas Instruments Inc., National Semiconductor Inc. and others. The servo or error amplifier 25 is a conventional differential input operational amplifier which is responsive to input signals applied at pins 2 and 3 thereof. At 41 there is provided a compensating capacitor and at 42 there is provided a bypass capacitor coupled to the pins of the amplifier 40 as shown. The output from the amplifier 40 is from pin 5 as shown and represents an error signal.

Pin 3 input of amplifier 40 is coupled to the diode 36 and thus one input signal to pin 3 is Vovl. The other input to pin 3 is the power supply output voltage Vos is applied to pin 3 input through an input resistor 43. The pin 2 input of amplifier 40 is coupled to point A. The voltage Va at point A and pin 2 is established under normal i.e., no current overload condition, by a reference voltage $V_{ref}$(eg + 5V) which is coupled to point A via an input resistor 46. Feedback from the output pin 5 of the amplifier 40 is provided by the network comprising resistors 47 and 49 and capacitor 48 coupled together in a conventional manner.

The voltage Vos is also coupled to a resistor 44 and diode 45 which is connected to point A. Under current overload conditions Vos is applied through resistor 44 and diodes 45 to reduce the effective reference voltage applied at pin 2 thereby causing the voltage Vos from the power supply to be reduced.

The operation of this invention is as follows:

Assuming that IV overload converter detects an overload current, an overload voltage signal Vovl is provided at the output thereof from diode 36. As Vovl rises above the voltage Vos (Vos is normally equal to $V_{ref}$ since the voltage at point A is normally $V_{ref}$), the error output signal at pin 5 of the amplifier 25 rises because Vovl at pin 3 is greater than $V_{ref}$. The rising error voltage at pin 5 causes the output voltages Vos of the power supply to be reduced which in turn causes the voltage at pin 2 (point A) to drop below $V_{ref}$. The voltage drop at point A is caused by Vos, now being less than $V_{ref}$, being dropped across a voltage divider comprising resistors 44 and 46. The dropping of the voltage at point A (pin 2) produces a further decreasing in Vos as shown in FIG. 2 after a current overload condition is detected as the amplifier 40 attempts to maintain a null voltage condition between pins 2 and 3 inputs.

When the current overload condition is removed, the power supply will return to its normal operation since Vovl will no longer be impressed upon pin 3.

I claim:

1. In a d.c. switching power supply having a power switcher, a power amplifier coupled to the switcher output, a power transformer coupled to the amplifier, a rectifier and filter coupled to said transformer, and an error amplifier coupled to said power switcher to control same, the improvement of current limit means coupled to said error amplifier for controlling the output error signal thereof upon the detection of a current overload condition in a manner to foldback the power supply output current, said current limit means comprises first means for generating and applying a signal representative of a current overload condition to one input of said error amplifier and said current limit means also comprising second means for altering the input signal applied to another input of said error amplifier.

2. In the supply of claim 1 in which said second means comprises third means coupled to said power supply output voltage for selectively changing the voltage applied to said another input of said error amplifier.

3. In the supply of claim 2 in which said third means comprises a diode and a resistor divider network.

4. In the supply of claim 2 in which said first means comprises a current overload sensing transformer coupled to said power transformer, and wherein one end of said divider network is coupled to means for providing a reference voltage.

5. An error amplifier for controlling a power supply, said error amplifier having two inputs, means for providing a voltage related to said power supply output voltage to a first input of said amplifier, means for providing a signal representative of a current overload condition in said power supply to said same input, means for providing a reference voltage to a second input of said amplifier and control means coupled to said second input and to said power supply output for selectively altering said voltage applied to said second input in order to foldback the current from said power supply in the event of a current overload condition, said control means comprises a blocking diode interposed between resistors of a voltage divider and in which said second input is coupled between said diode and one of said resistors.

6. A power supply including an error amplifier comprising linear amplifier means responsive to the output power supply voltage, a feedback voltage and a reference voltage for generating an error signal to control the output power supply voltage, the improvement of first means for combining a voltage representative of a power supply overload current signal with the output power supply voltage to cause the error signal to be altered in a manner to reduce the output current in the event of a current overload condition and a power supply overload signal is generated by second means coupled to said power supply for converting a current overload indication into a voltage overload signal.

7. In a power supply having means controlled by an error signal provided by an error amplifier, said means generating an output signal d.c. voltage, the improvement of an error amplifier having first means for providing a voltage signal representative of a current overload condition in the power supply and second means for altering the effective reference voltage seen by the amplifier in order to foldback the output current from said power supply said second means comprises means for impressing a reduced power supply output signal voltage upon a voltage divider network coupled to said amplifier input in order to reduce power supply output current after detection of a current overload condition.

* * * * *